(12) United States Patent
Bartel et al.

(10) Patent No.: US 8,255,733 B1
(45) Date of Patent: Aug. 28, 2012

(54) CLOCK DELAY AND SKEW CONTROL SYSTEMS AND METHODS

(75) Inventors: Robert M. Bartel, Beaverton, OR (US); Kent R. Callahan, Hillsboro, OR (US); Michael G. France, Austin, TX (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 524 days.

(21) Appl. No.: 12/512,944

(22) Filed: Jul. 30, 2009

(51) Int. Cl.
*G06F 1/04* (2006.01)
*G06F 1/12* (2006.01)

(52) U.S. Cl. ........ 713/401; 713/400; 713/500; 713/503; 331/10

(58) Field of Classification Search .................. 713/400, 713/401, 500, 503; 331/10
See application file for complete search history.

(56) References Cited

U.S. PATENT DOCUMENTS

| | | | |
|---|---|---|---|
| 5,563,592 A | 10/1996 | Cliff et al. | |
| 5,754,734 A | 5/1998 | Emeott et al. | |
| 5,768,372 A | 6/1998 | Sung et al. | |
| 5,794,033 A | 8/1998 | Aldebert | |
| 5,872,529 A | 2/1999 | Mejia | |
| 6,028,445 A | 2/2000 | Lawman | |
| 6,038,185 A | 3/2000 | Ng | |
| 6,044,025 A | 3/2000 | Lawman | |
| 6,327,634 B1 | 12/2001 | Statovici | |
| 6,353,648 B1 | 3/2002 | Suzuki | |
| 6,483,342 B2 | 11/2002 | Britton et al. | |
| 6,493,862 B1 | 12/2002 | Young et al. | |
| 6,507,214 B1 | 1/2003 | Snyder | |
| 6,507,943 B1 | 1/2003 | Kelem | |
| 6,525,678 B1 | 2/2003 | Veenstra et al. | |
| 6,531,974 B1 | 3/2003 | Callahan et al. | |
| 6,563,437 B1 | 5/2003 | Landry et al. | |
| 6,564,285 B1 | 5/2003 | Mills | |
| 6,744,388 B1 | 6/2004 | Khu | |
| 6,772,230 B2 | 8/2004 | Chen et al. | |
| 6,785,165 B2 | 8/2004 | Kawahara | |
| 6,794,912 B2 | 9/2004 | Hirata et al. | |
| 6,885,227 B2 | 4/2005 | Agrawal et al. | |
| 6,903,574 B2 | 6/2005 | Chen et al. | |
| 7,019,577 B2 | 3/2006 | Agrawal et al. | |
| 7,034,599 B1 | 4/2006 | Agrawal et al. | |
| 7,382,169 B2 | 6/2008 | Nikolov et al. | |
| 7,456,672 B1 | 11/2008 | Callahan et al. | |
| 2004/0061147 A1 | 4/2004 | Fujita | |
| 2004/0064622 A1 | 4/2004 | Smith | |
| 2005/0093584 A1 | 5/2005 | Meacham | |
| 2008/0204151 A1* | 8/2008 | Talwalkar | 331/10 |

OTHER PUBLICATIONS

U.S. Appl. No. 10/809,658, filed Mar. 25, 2004, Tang.
U.S. Appl. No. 11/243,255, filed Oct. 4, 2005, Tang.
U.S. Appl. No. 11/346,817, filed Feb. 3, 2006, Chen et al.
U.S. Appl. No. 11/494,862, filed Jul. 28, 2006, Booth et al.
U.S. Appl. No. 11/924,088, filed Oct. 25, 2007, Robert Bartel.
John G. Maneatis, Low-Jitter Process-Independent DLL and PLL Based on Self-Biased Techniques,IEEE Journal of Solid-State Circuits, vol. 31, No. 11, Nov. 1996, 10 pages.

* cited by examiner

*Primary Examiner* — Kim Huynh
*Assistant Examiner* — Michael J Brown

(57) ABSTRACT

A method of providing a clock signal for an embodiment includes performing a calibration for a closed loop control system to determine a control signal value that provides a desired tuning of the closed loop control system. The control signal value is stored and provided to a delay circuit, wherein a delay range and a delay step size of the delay circuit is based on the control signal value. A delay select control signal is provided to the delay circuit to select a specific delay within the delay range.

14 Claims, 10 Drawing Sheets

CLOCK DELAY AND SKEW CONTROL SYSTEMS AND METHODS

TECHNICAL FIELD

The present invention relates generally to electrical circuits and, more particularly, to clock systems and methods for electrical devices.

BACKGROUND

Clock signals for electrical devices may be constrained by a number of error sources. For example, these error sources may include delay variations among signals for a closed-loop frequency-control system (e.g., a delay-locked loop (DLL), a phase-locked loop (PLL), or a frequency-locked loop (FLL)), channel-to-channel skew, and various forms of jitter.

Various approaches to eliminate mismatch (e.g., delay or timing mismatch) between clock channels include layout techniques, providing gate delays, and trimming. However, these approaches generally provide only a coarse approximation and may not reduce mismatch to acceptable levels, especially over process, voltage, and temperature.

As a result, there is a need for improved clock techniques, which may reduce and/or control mismatch and provide improved skew control.

SUMMARY

In accordance with one embodiment of the present invention, a method of providing a clock signal includes performing a calibration for a closed loop control system to determine a control signal value that provides a desired tuning of the closed loop control system; storing the control signal value; providing the control signal value from the storing to a delay circuit, wherein a delay range and a delay step size of the delay circuit is based on the control signal value; and providing a delay select control signal to the delay circuit to select a specific delay within the delay range.

In accordance with another embodiment of the present invention, a integrated circuit includes a closed loop control system adapted to provide a clock signal; a first digital-to-analog converter (DAC) adapted to provide a control signal to the closed loop control system to provide coarse tuning of the closed loop control system; a memory adapted to store a control signal value based on the coarse tuning of the closed loop control system; a second DAC adapted to receive the control signal value stored in the memory and provide a reference signal based on the control signal value; and a delay circuit adapted to receive the clock signal, the reference signal, and a delay select control signal and provide a delayed clock signal, wherein a delay range and a delay step size of the delay circuit is based on the reference signal, and wherein a specific delay within the delay range applied to the clock signal to provide the delayed clock signal is based on the delay select control signal.

In accordance with another embodiment of the present invention, a integrated circuit includes a closed loop control system adapted to provide a clock signal; a first digital-to-analog converter (DAC) adapted to provide a control signal to the closed loop control system to provide coarse tuning of the closed loop control system; a memory adapted to store a control signal value based on the coarse tuning of the closed loop control system; a second DAC adapted to receive the control signal value stored in the memory and provide a reference signal based on the control signal value; and a delay circuit adapted to receive the clock signal, the reference signal, and a plurality of delay select control signals and provide a plurality of delayed clock signals, wherein a delay range and a delay step size of the delay circuit is based on the reference signal, and wherein a specific delay within the delay range applied to the clock signal to provide the plurality of delayed clock signals is based on the corresponding delay select control signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
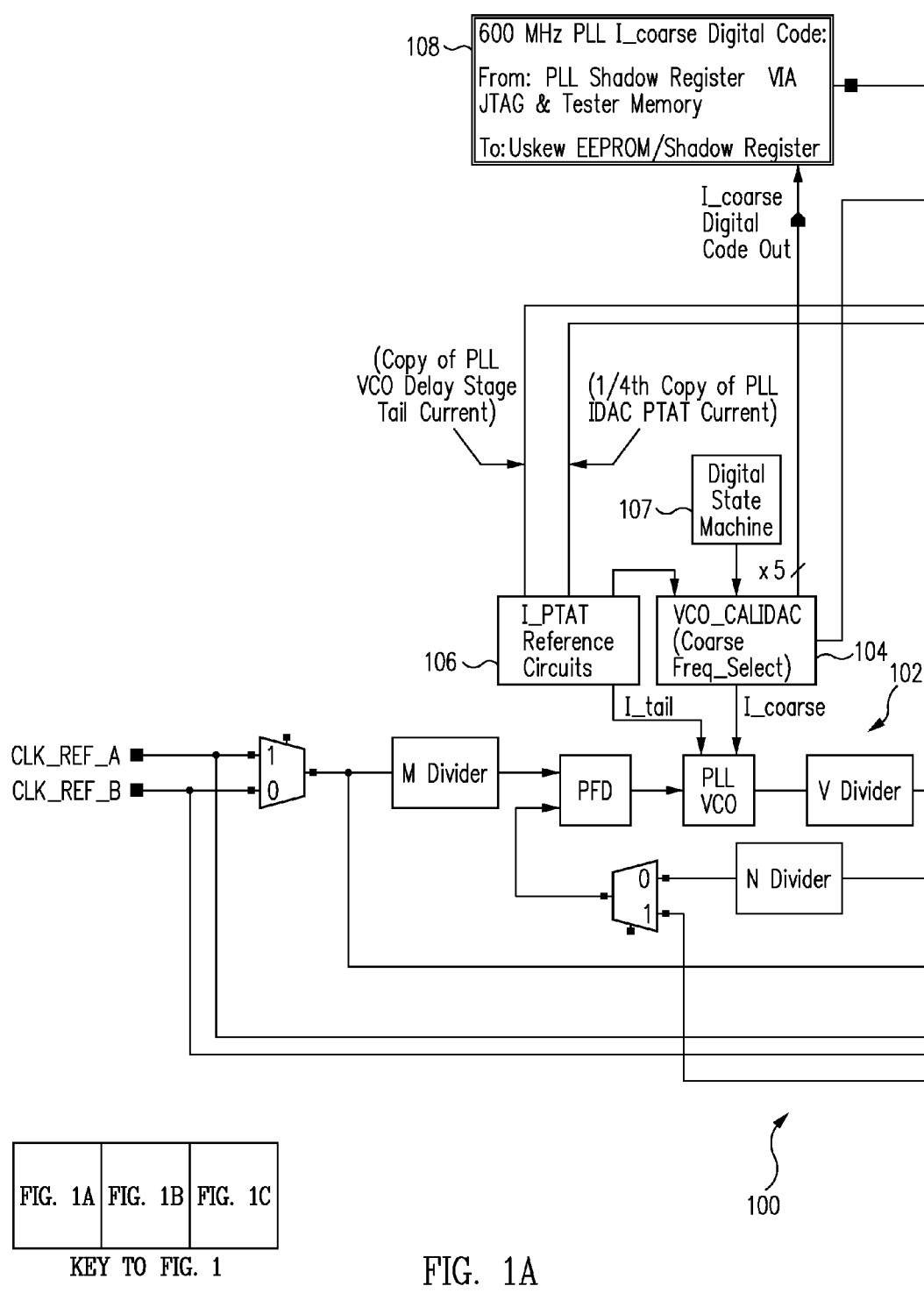
FIG. 1 shows a block diagram illustrating a circuit for providing one or more clock signals in accordance with an embodiment of the present invention.
Figure 1B:
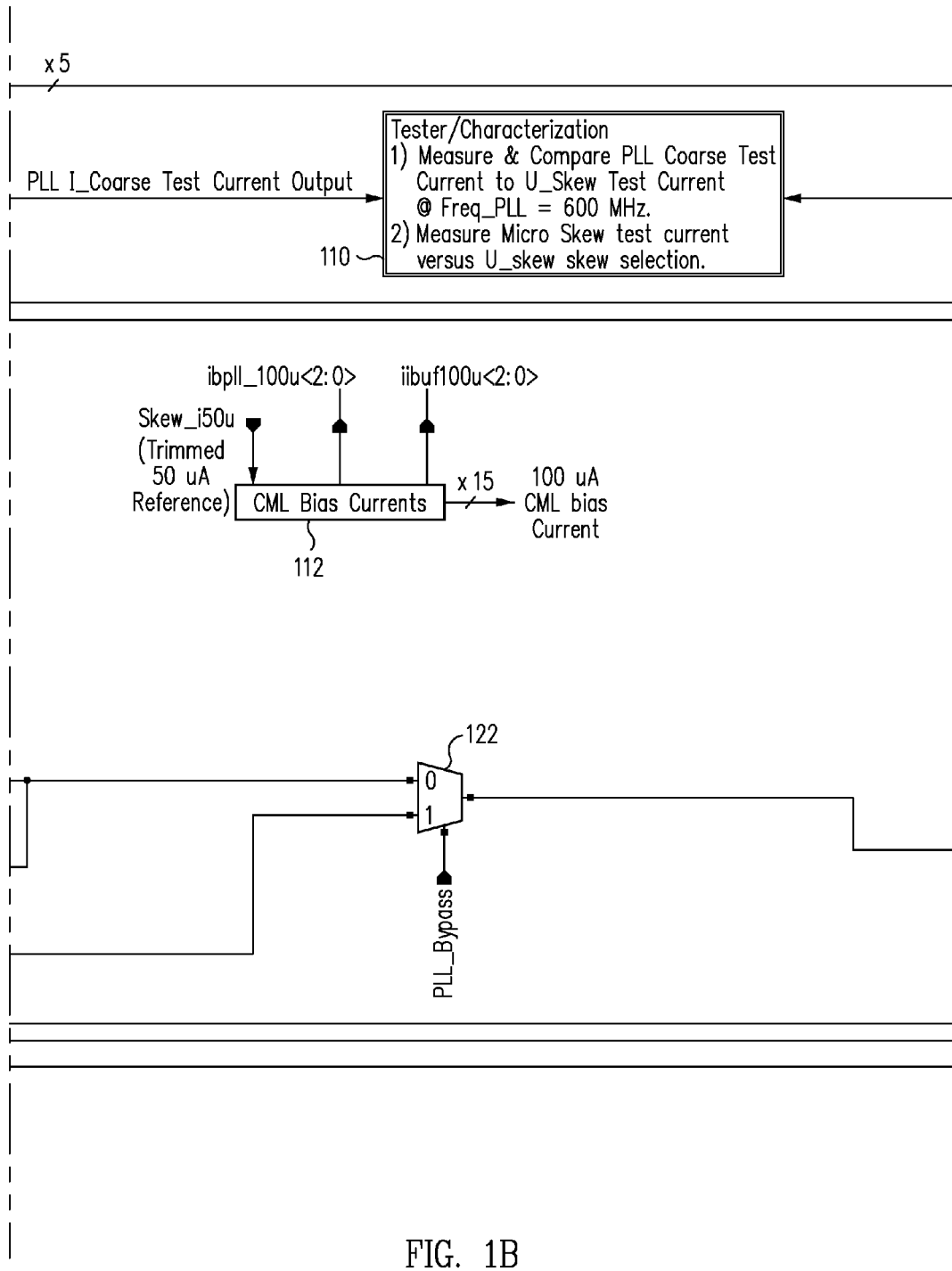
Figure 1C:
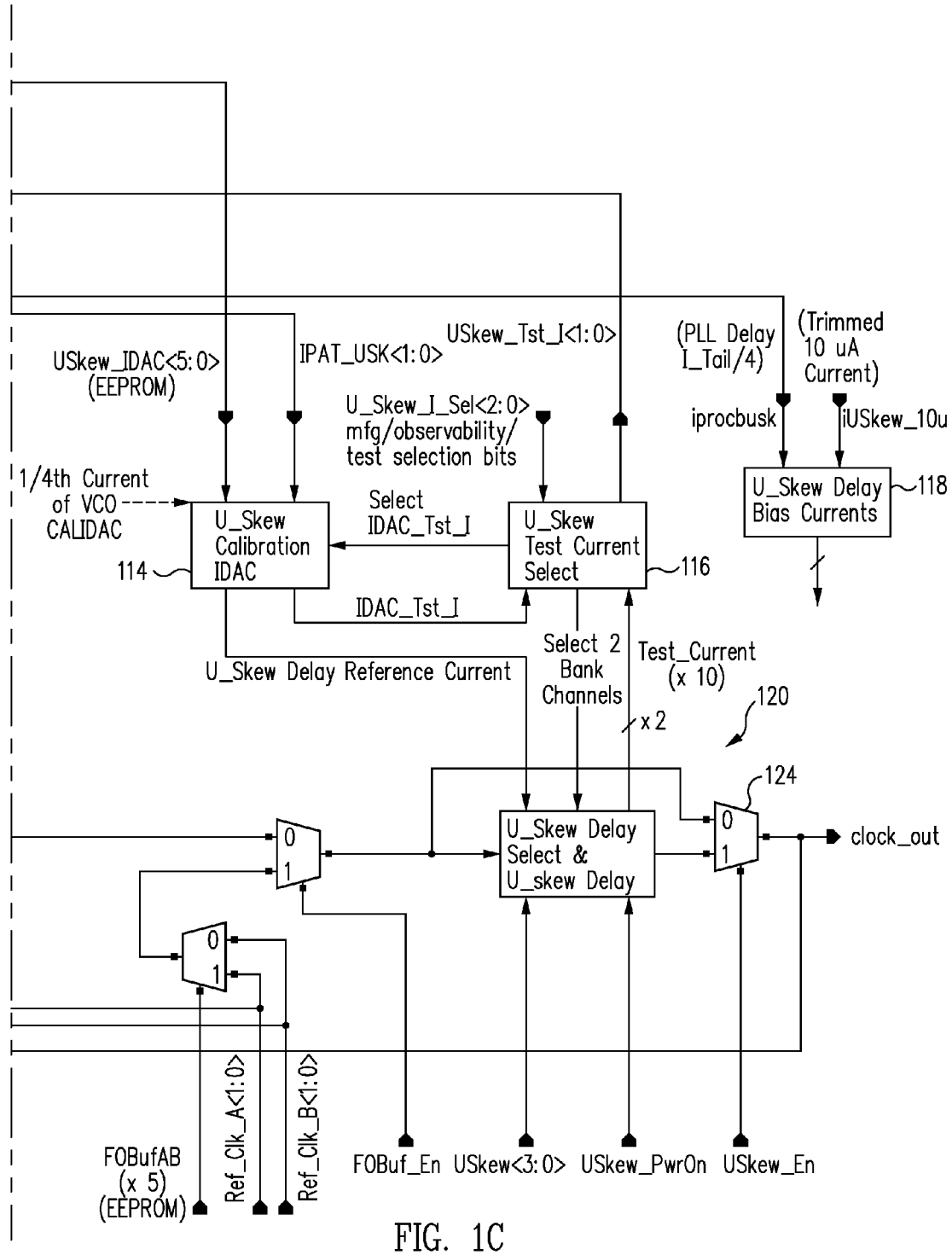
Figure 2A:
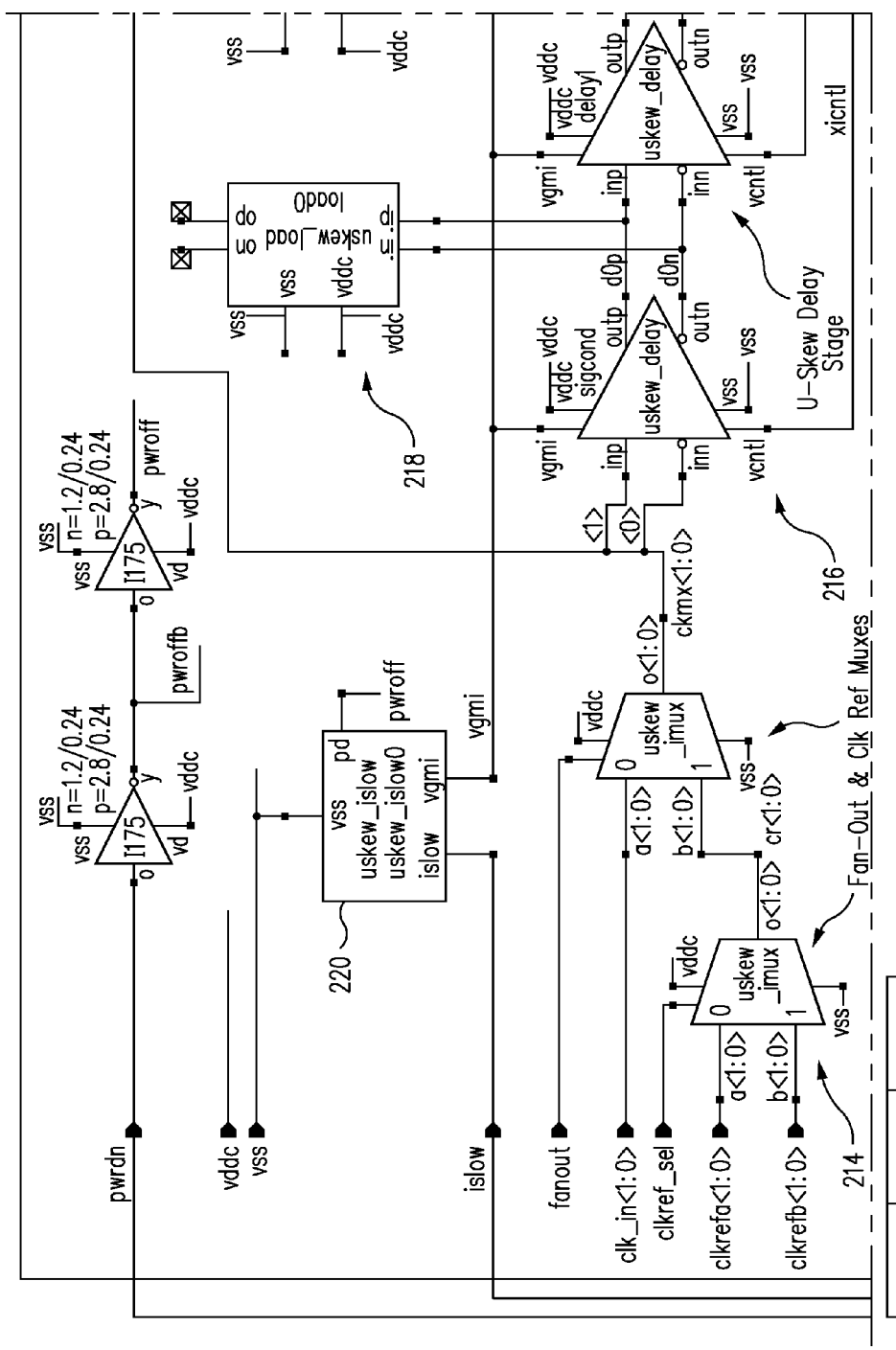
FIG. 2 shows a block diagram illustrating a circuit implementation example for a portion of FIG. 1 in accordance with an embodiment of the present invention.
Figure 2B:
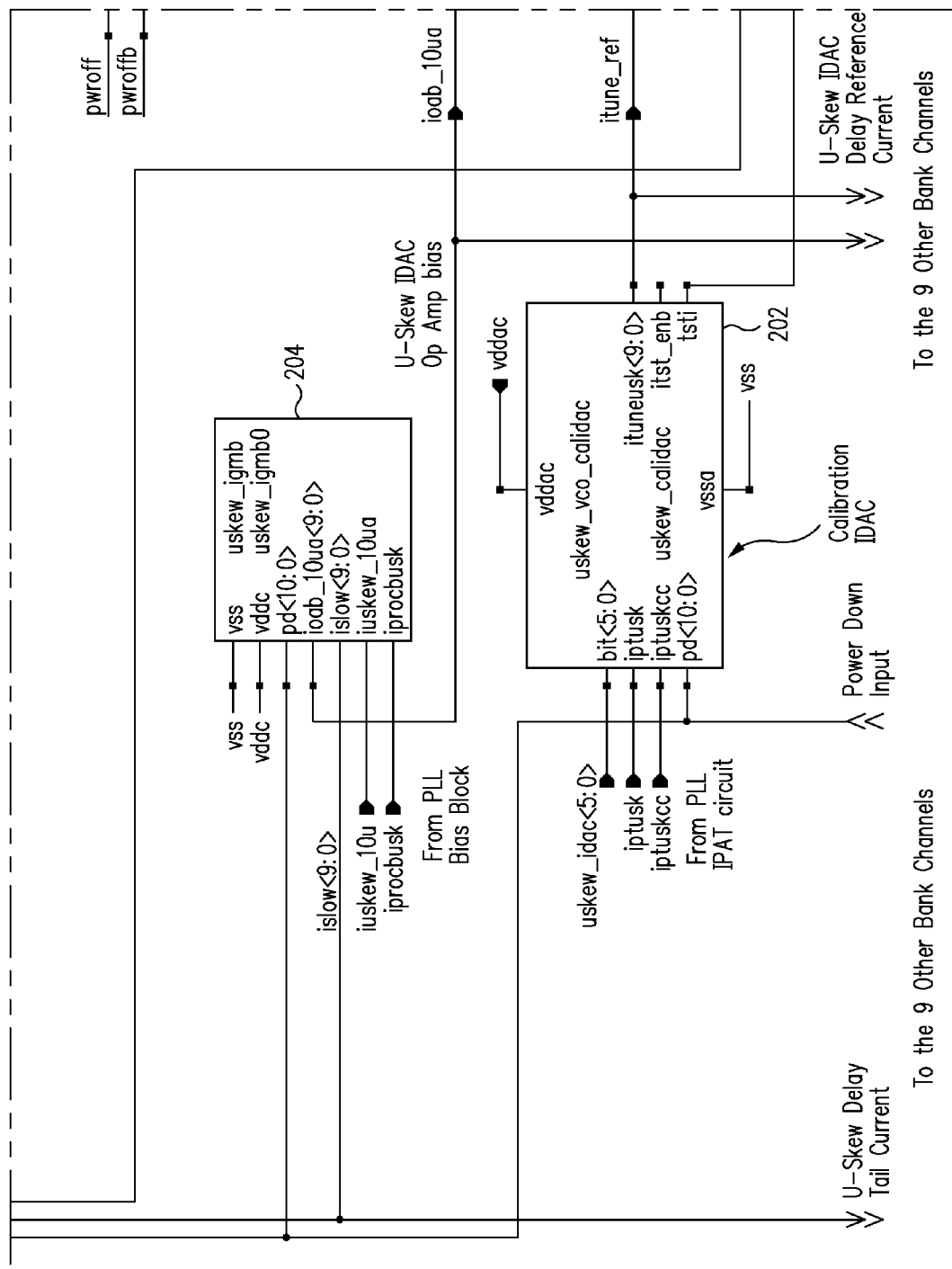
Figure 2C:
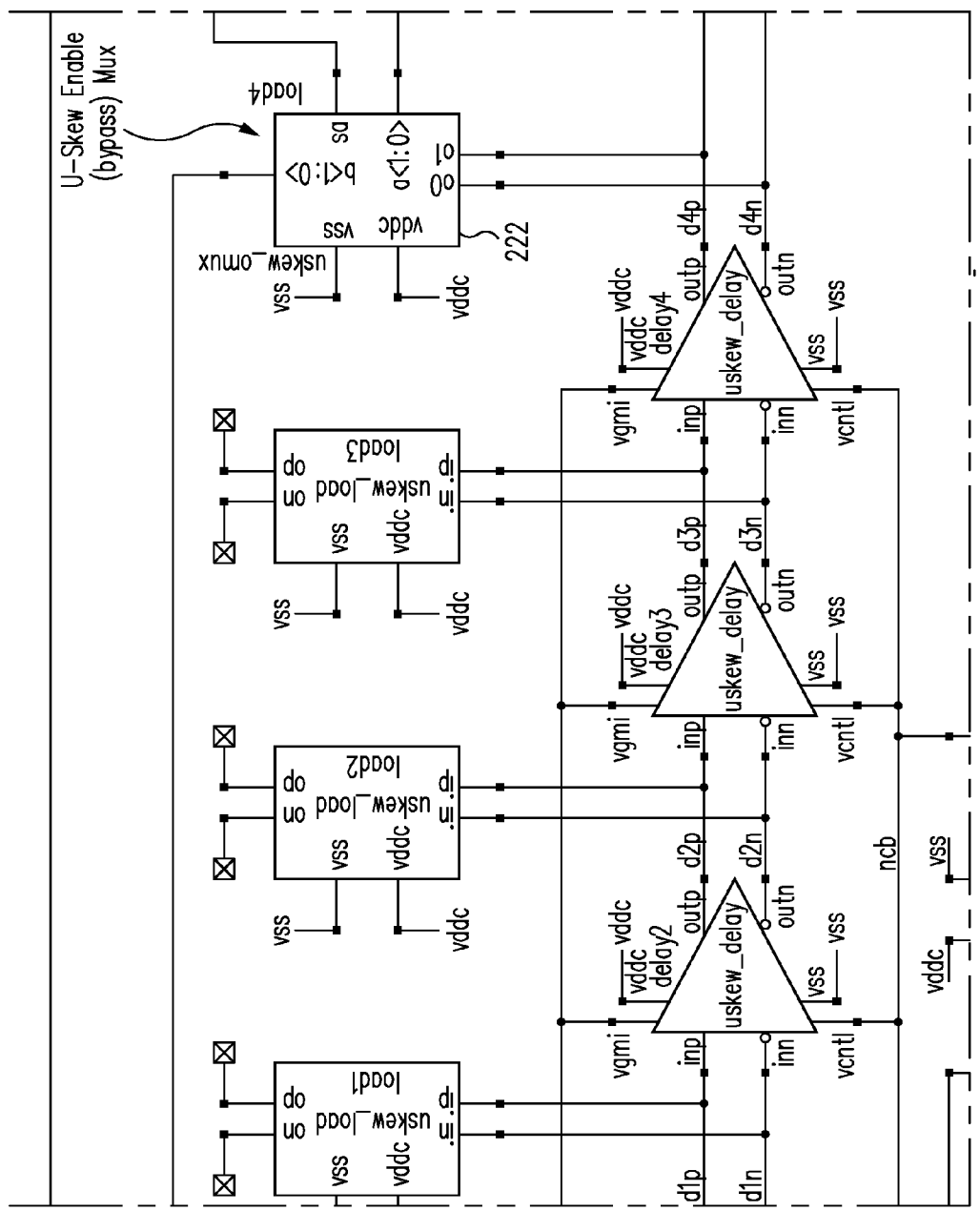
Figure 2D:
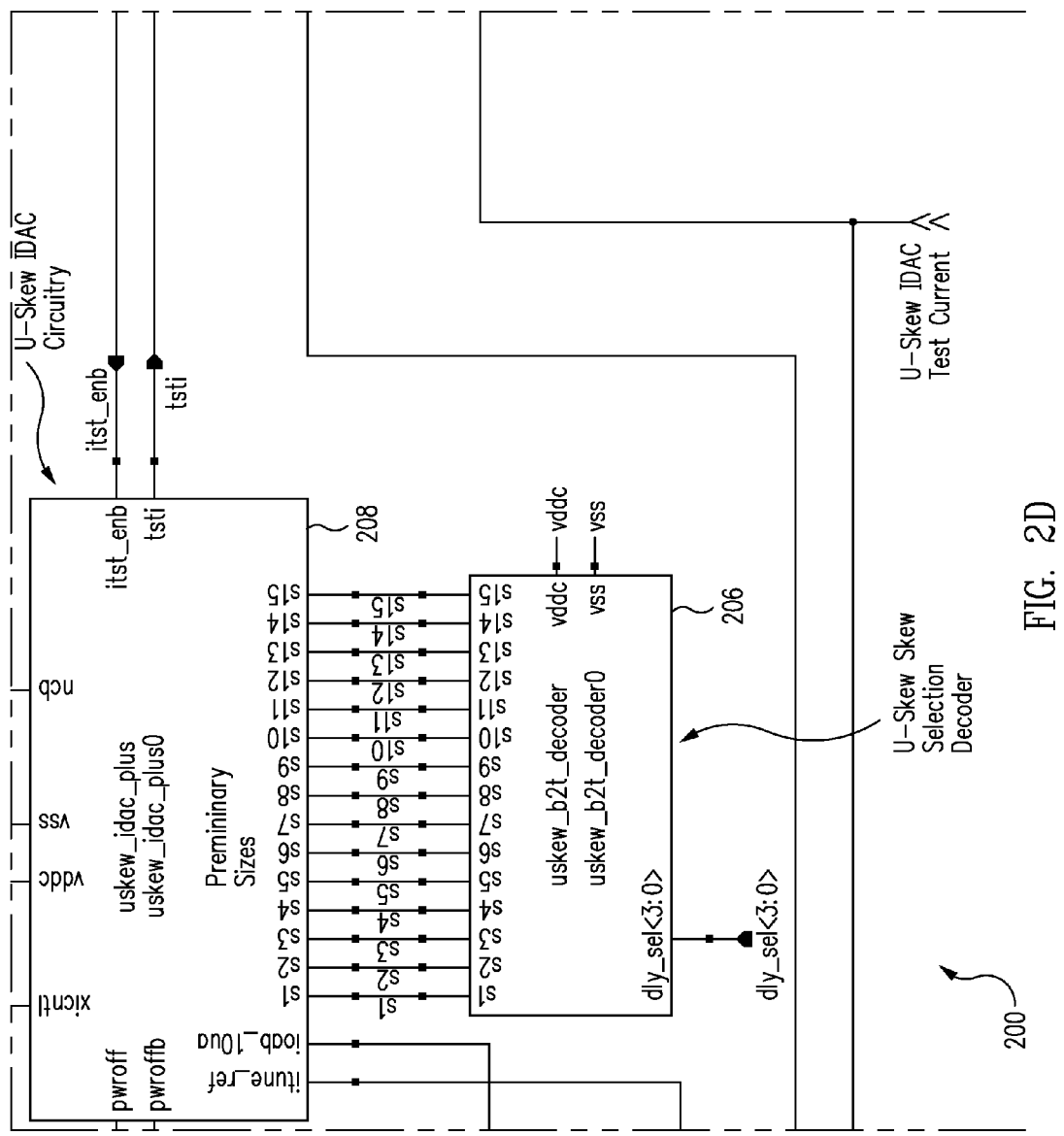
Figure 2E:
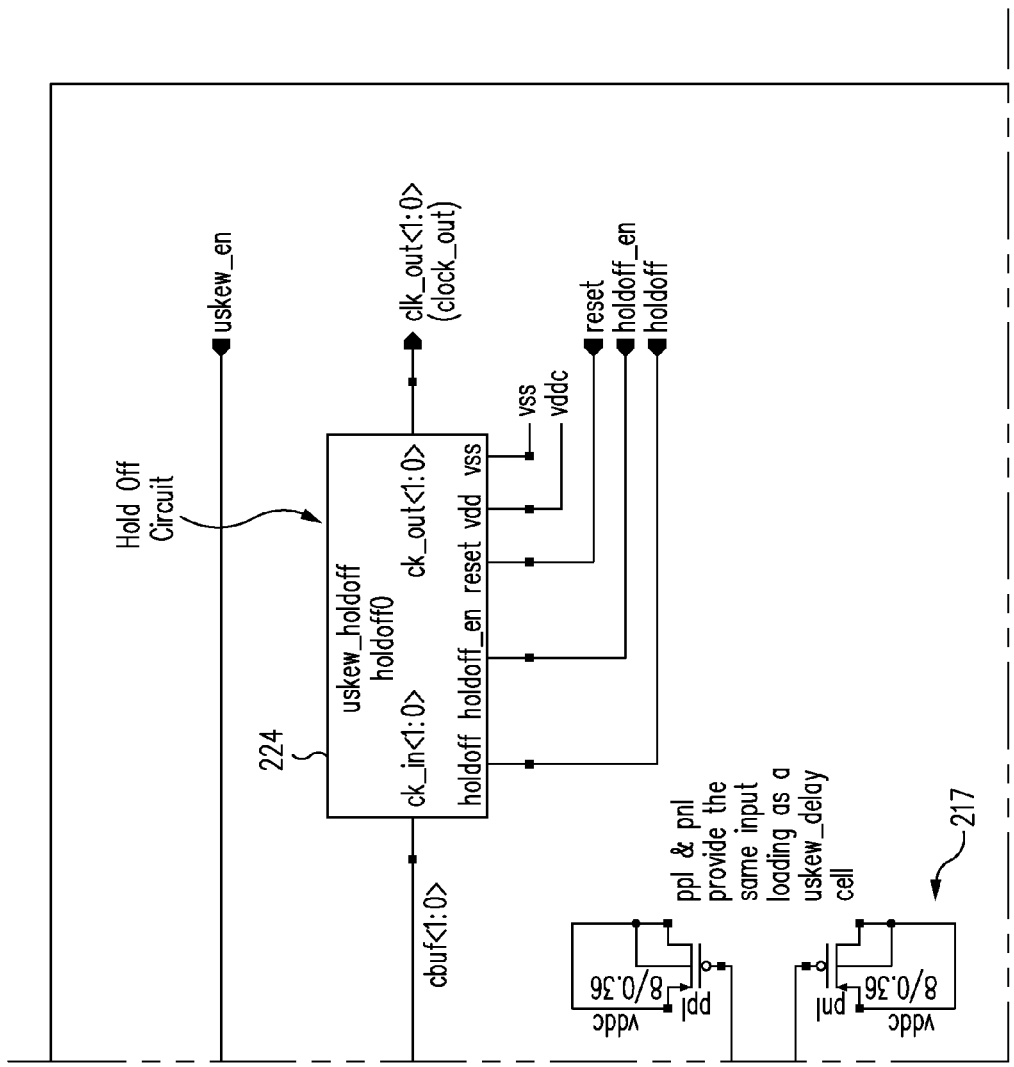
Figure 2F:
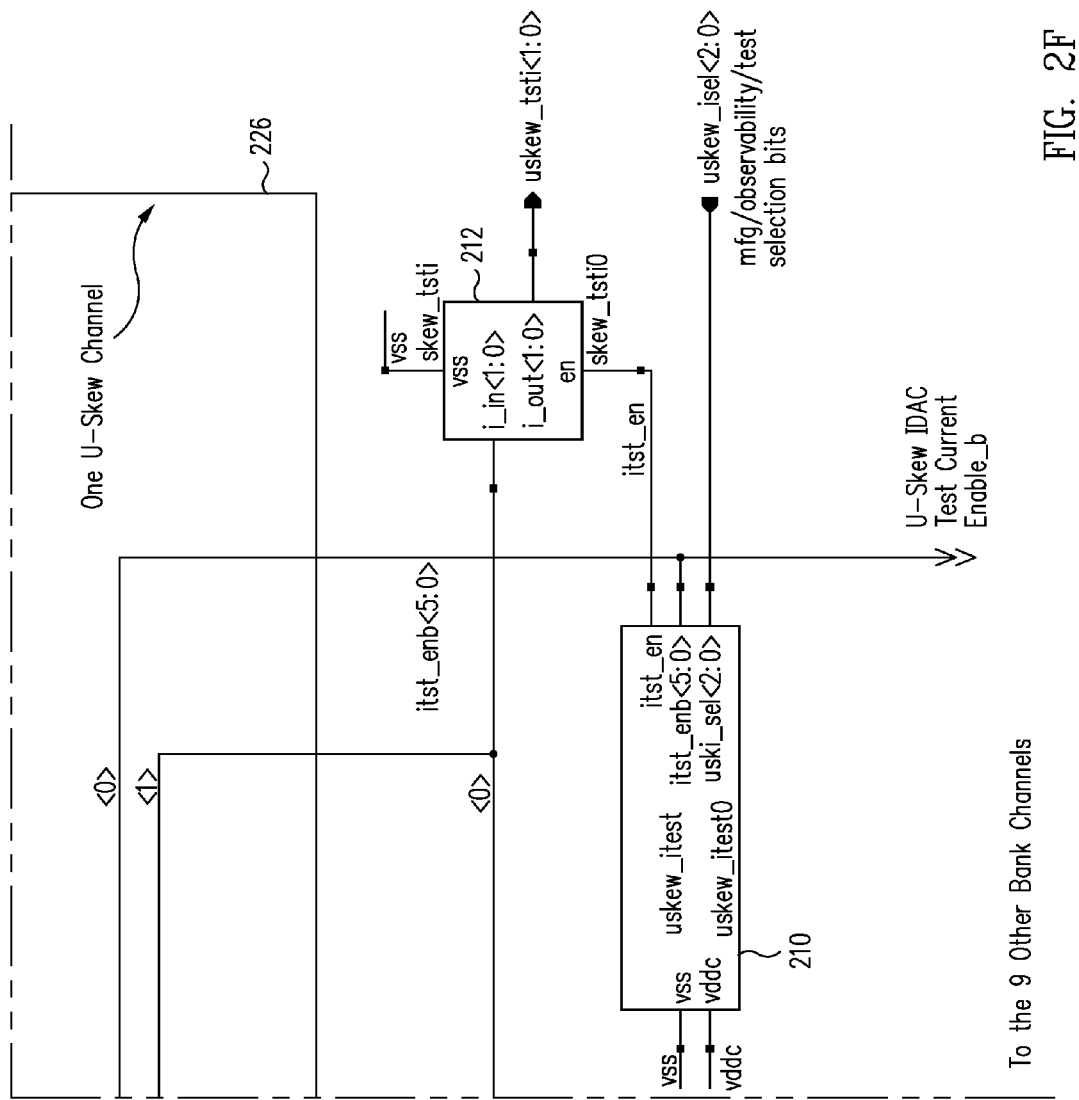

FIG. 1 shows a block diagram illustrating a circuit 100 for providing one or more clock signals in accordance with an embodiment of the present invention. Circuit 100 may represent, for example, a clock generator integrated circuit, a buffer integrated circuit (chip), or generally as a circuit within any type of integrated circuit and is shown in a general non-limiting fashion as a circuit example to illustrate one or more embodiments of the present invention. For example, circuit 100 is shown to illustrate a typical integrated circuit that may utilize skew control and provide clock signals for one or more clock channels with appropriate clock delay and skew control for the clock signals within the various clock channels (e.g., distributed within the integrated circuit and/or to other integrated circuits). Furthermore, it should be understood that reference to a PLL, DLL, and/or FLL refers generally to a closed-loop frequency-control system and such reference is not limiting as would be understood by one skilled in the art.

Circuit 100 includes a closed-loop frequency-control system 102, a digital-to-analog converter (DAC) 104, optional reference circuits 106 and 118, a digital state machine 107, associated circuitry 108, test circuit 110, bias current circuit 112, a DAC 114, a test and select circuit 116, and delay circuitry 120. As an example, closed-loop frequency-control system 102 may represent for this implementation example a PLL and, as noted herein, is not limiting and may be substituted for example with a DLL or an FLL, depending upon the desired application and requirements as would be understood by one skilled in the art.

Closed-loop frequency-control system 102 (also referred to herein as PLL 102 for this example) is shown generally in circuit 100 and may include generally various functional PLL blocks, such as a charge pump, loop filter, etc., in addition to PFD, PLL VCO, and divider blocks (M, V, and N) shown in circuit 100. Various multiplexers may be provided to select from among various signals (e.g., CLK-REF_A, CLK_REF_B, Ref_Clk_A, Ref_Clk_B), with these signals provided for example within the integrated circuit of circuit 100 or external such as via integrated circuit pins. The control signals for the various multiplexers may be provided within the integrated circuit by logic circuitry and/or non-volatile memory or externally such as via integrated circuit pins.

PLL 102 may be bypassed via an optional bypass multiplexer 122 (controlled by a PLL_Bypass control signal). A feedback signal may be provided optionally from an output signal of PLL 102 or from an output signal (clock_out signal) from delay circuitry 120. Similarly, delay circuitry 120 may be bypassed by an optional multiplexer 124 (controlled by a control signal (USkew_En)).

DAC 104 is used to provide coarse tuning control for PLL 102 (e.g., via a digital control signal labeled I_coarse), while reference circuits 106 and 118 are optional circuits to provide process and temperature compensation (e.g., process, voltage, and temperature (PVT) compensation) for PLL 102 and delay circuitry 120 (e.g., via signals labeled I_tail and associated proportional signal values as required for a desired application as would be understood by one skilled in the art).

Associated circuitry 108 represents memory (e.g., volatile and/or non-volatile memory), such as non-volatile (e.g., EEPROM) memory to store a digital control word based on the calibration of PLL 102, as discussed further herein for use by delay circuitry 120. Associated circuitry 108 may further represent JTAG, test support, or other functional aspects within circuit 100 as discussed further herein.

Test circuit 110 represents functional aspects within circuit 100 to calibrate PLL 102 and delay circuitry 120 as discussed further herein. Test circuit 110 may further represent test equipment external to circuit 100 (e.g., external to the integrated circuit). For example, test circuit 110 may receive values from DAC 104 and test and select circuit 116 to compare relative calibration and test currents, such as comparing current values between PLL 102 and delay circuitry 120 or current values associated with delay circuitry 120. It should be understood that circuit 100 represents functional aspects in accordance with embodiments and the various functional blocks (e.g., associated circuitry 108 and test circuit 110) may be combined or implemented separately as desired for a given application.

Bias current circuit 112 represents generally bias current generation for various circuitry within circuit 100. DAC 114 provides reference currents and proper calibration for delay circuitry 120. Test and select circuit 116 communicates with DAC 114 and is used by test circuit 110 for calibration and testing of delay circuitry 120.

In general, circuit 100 illustrates a functional block diagram of skew (or microskew) control for one or more clock channels (provided via delay circuitry 120), including PLL and skew control, operation, calibration, and test interfaces. It should be noted that skew is also referred to herein as microskew, such as to denote fine, precise skew control generally, for example, as in terms of microseconds or picoseconds, and the term is not limited to a certain range or values, but is simply a naming convention as would be understood by one skilled in the art.

PLL 102 is used to calibrate delay circuitry 120 (also referred to herein as skew (or microskew) circuits) in accordance with one or more embodiments. PLL 102 may be controlled to perform coarse tuning by a digital state machine 107, as would be understood by one skilled in the art. For example, coarse tuning bands of PLL 102 may be used to calibrate delay circuitry 120 (various clock signal skew circuits) and may further be used to extend PLL (e.g., VCO) tuning range and/or reduce the gain of the VCO and hence increase jitter immunity.

As an example of general operation for an embodiment, at wake up (e.g., start up), a digital calibration may be performed for PLL 102. This calibration may be run by digital state machine 107 (e.g., which may be incorporated with associated software or logic of associated circuitry 108 or test equipment 110), as would be understood by one skilled in the art, which steps through the tuning bands and compares the output frequency of the VCO and dividers (if used) of PLL 102 to the input reference clock. During this calibration process, the output of the charge pump within PLL 102 may be held at a mean control voltage level.

After the course tuning band is found that is within the tuning range of the charge pump and the VCO of PLL 102, the charge pump is enabled and the conventional PLL control loop is allowed to bring PLL 102 to a locked state. The coarse tuning process may use DAC 104 (e.g., a current DAC providing a control signal (I-coarse) to PLL 102), with the digital value (digital control value of the control signal (I-coarse)) of this DAC setting used to set a nominal delay value for delay circuitry 120 (microskew circuits) in accordance with one or more embodiments. For example, a digital control value (labeled I-coarse Digital Code Out) may be stored in associated circuitry 108 and used to set delay settings associated with delay circuitry 120, where delay circuitry 120 may include some portion of appropriately sized and replicated circuitry of PLL 102 as discussed further herein.

This calibration process may reduce process variation and furthermore, in accordance with one or more embodiments, bias circuits associated with PLL 102 may be used or replicated for use with delay circuitry 120, which may reduce temperature variation and may provide a more accurate delay control over process and temperature. Additionally, voltage control may be performed by using an on chip regulator (e.g., within associated circuitry 108) and thus, a significant portion of PVT variation may be removed and the microskew delay provided by delay circuitry 120 may be more accurate and based on the digital control value (digital control DAC value) from the calibration process.

FIG. 2 shows a block diagram illustrating an implementation example of a circuit 200 for a portion of FIG. 1 in accordance with an embodiment of the present invention. In reference to FIG. 2 (and FIG. 1 generally), circuit 200 may be viewed as illustrating generally one clock channel (one microskew clock channel 226 or microskew circuit) of delay circuitry 120 along with associated circuitry for this clock channel and any other clock channels within delay circuitry 120. Thus in other words, circuit 200 may be viewed as illustrating one microskew circuit (U-Skew circuit) used by a single bank channel along with support circuitry used by all of the microskew circuits within the bank channels associated with delay circuitry 120. The microskew circuits (such as microskew clock channel 226) may be implemented and replicated, for example, in an identical fashion, with all of these microskew circuits supported by a single common set of associated circuitry (e.g., a DAC 202; reference circuit 204, and test circuits 210 and 212).

Specifically for this implementation example, circuit 200 includes microskew clock channel 226, DAC 202, reference circuit 204, and test circuits 210 and 212. Microskew clock channel 226 may be viewed as an example of a circuit implementation that may represent generally at least a portion of delay circuitry 120 (FIG. 1). As a further example, DAC 202 may represent DAC 114 (FIG. 1), reference circuit 204 may represent reference circuit 118 (FIG. 1), and test circuits 210 and 212 may represent test and select circuit 116 (FIG. 1) or some corresponding portion thereof.

Multiplexers 214 are used to select either fan-out mode (e.g., if clkrefa (e.g., CLK_REF_A or Ref_Clk_A) or clkrefb (e.g., CLK_REF_B or Ref_Clk_B) signals are provided to delay circuitry 120) or a normal mode of clock signals (e.g., clk_in signal) provided as an output from PLL 102. A microskew delay circuit 216 is provided between multiplexers 214 and a hold-off circuit 224, with hold-off circuit 224 providing a final clock output signal (clk_out or clock_out) of the microskew clock channel 226 (microskew block). For example, hold-off circuit 224 may drive the final clock output signal to bank channel pin output buffers and/or BSCAN logic. Hold-off circuit 224 may function as a buffer gating its input clock with the hold-off function.

A multiplexer 222 may be used to bypass microskew delay circuit 216 and may represent an implementation of bypass multiplexer 122 (FIG. 1). Multiplexer 222 may select an output from microskew delay circuit 216 or the output of multiplexers 214 (the fan-out muxes) to provide to hold-off circuit 224.

A power down signal (labeled pwrdn, e.g., provided via a power down input pin) may be provided to power down various microskew circuitry. For example, if the microskew circuitry is not enabled, the microskew circuitry may still be powered up and thus if desired, the power down signal (pwrdn) may be asserted to eliminate supply current normally provided to the microskew circuitry.

The microskew circuitry (or microskew channel 226) as shown in FIG. 2 may include microskew delay circuit 216, which may includes five microskew delay stages (each labeled uskew_delay), a microskew current DAC (IDAC) 208, a skew selection decoder 206 (labeled uskew_b2t_decoder), and dummy load cells 218 (each labeled uskew_load). Microskew delay circuit 216 provides an output signal to multiplexer 22 (uskew enable mux or bypass mux) and to a dummy load circuit 217 (bias or load circuits to provide input loading similar to a microskew delay stage).

The clock delay through the last four microskew delay stages of microskew delay circuit 216 may be determined by a bias voltage signal (ncb) and to a lesser degree by a bias voltage signal (vgmi) provided by an optional reference circuit (uskewislow) 220.

Skew selection decoder 206 receives delay select signal (dly_sel, such as four bits via input pins), which may be programmable inputs and control or select the desired delay through the last four microskew delay stages of microskew delay circuit 216. For example, as the delay select signal (dly_sel) bits are incremented (e.g., binary value) from zero to fifteen, the delay through the last four microskew delay stages is incremented in single microskew steps. As an implementation example, this decreases the bias voltage of bias voltage signal (ncb) (e.g., on a node ncb), for example, in a monotonic fashion, which reduces the current available for the last four microskew delay stages to slew each of their output nodes up or down. A copy of this available current may optionally be provided through a test circuit 212 (e.g., via a pin (uskew_tsti pin) when enabled during manufacturer testing by a test circuit 210).

The exact amount of delay, skew step value, and total delay or skew range (e.g., all fifteen skew steps) may be determined predominately by how much current is provided by a DAC 202 (similar to DAC 114 of FIG. 1) via a control signal (itune_ref). A copy of this current may optionally be provided through test circuit 212 (e.g., via pin (uskew_tsti pin) when enabled during manufacturer testing by test circuit 210).

The microskew delay stages may be sized as replicas (e.g., one-quarter replicas) of the delay stages within PLL 102 (FIG. 1, e.g., PLL VCO (or ICO)). DAC 202 (uskew_calidac) may also be sized as a replica (e.g., one-quarter replica) of DAC 104 (FIG. 1, vco_calidac). As would be understood by one skilled in the art, scaling may reduce power consumption and die area consumed without a significant reduction in accuracy and skew control.

A control signal (uskew_idac) provided to DAC 202 (e.g., via microskew pins uskew_idac<5:0>) may be supplied (or driven), for example, by memory or logic (e.g., within associated circuitry 108, such as EEPROM shadow registers or any other register or memory element as shown in FIG. 1 for DAC 114). A bias current (iptusk) may be provided (e.g., via iptusk terminal (or pin)) to bias DAC 202. The bias current (iptusk) is a copy of the current used to bias DAC 104 (vco_calidac). The current provided by control signal (itune_ref) from DAC 202 (e.g., a current DAC) may be, for example, a binary weighted value of the bias current (iptusk) based on the digital codes of the control signal (uskew_idac, e.g., uskew_idac<5:0> pin signals).

The first microskew delay stage of microskew delay circuit 216 may function as a signal conditioner to deliver a clock input to the next microskew delay stage with rise and fall times similar to what is provided between the delay stages inside PLL 102 (e.g., the PLL's ICO). Thus, the first microskew delay stage helps to keep the delay across the other four microskew delay stages to be substantially the same for all values of the delay select signal (dly_sel, e.g., dly_sel<3:0>).

The first microskew delay stage is controlled by a control signal (xicntl) from DAC 208. For example, the voltage provided by control signal (xicntl), which is not altered by the delay select signal (dly_sel), may be approximately the same as the voltage on the bias voltage signal (ncb) if the delay select signal (dly_sel) provides a logic low (e.g., all dly_sel<3:0> bits are logic 0). Thus, this may define a nominal delay value across the last four microskew delay stages.

The four microskew delay stages may also be biased by a bias signal (vgmi) from reference circuit (uskew_islow) 220, which for example may be used to reduce process and temperature variation for the microskew delay stages. The bias voltage provided by the bias signal (vgmi) determines the value of tail current used within the microskew delay stages (or delay stage cells) and, ignoring generally current mirroring losses, may be approximately the same voltage as provided to PLL 102 (e.g., the PLL's ICO delay stage cells). Thus in general as an example, the bias signal (vgmi) and the equivalent voltage of PLL 102 are not varied with the operating frequency of PLL 102. The voltage of the bias signal (vgmi), which is based on a bias current (islow) provided by a reference circuit 204 (e.g., via an islow pin or terminal), is a mirrored version of the current used to bias the delay stages of PLL 102 (e.g., the PLL's ICO delay stages). Therefore, any process and temperature variations on the bias current of PLL 102 will be directly tracked by the microskew delay stage bias current based on the bias current (islow).

Consequently, delays through delay stages of PLL 102 (e.g., the PLL's ICO delay stages) may be tracked by the microskew delay stages of microskew delay circuit 216, which may be beneficial, for example, with respect to process variations. In general, PLL 102 may also compensate for temperature variations (e.g., via the PLL's V2I block) to this current due to the closed loop operation of PLL 102.

Temperature compensation may be provided for the microskew delay stages via the bias voltage signal (vgmi) and/or the bias current (islow). Alternatively or additionally, a temperature compensation circuit associated with PLL 102 (e.g., reference circuits 106 and 118 and/or within PLL 102) may also provide a temperature compensation signal (iptusk) to DAC 202. The temperature compensation signal (iptusk) may be proportional to an absolute temperature and may be a copy of and track the temperature compensation signals (e.g., currents) used by DAC 104 (PLL's vco_calidac) to help stabilize the operating frequency of PLL 102. Thus, the temperature compensation signal (iptusk) may not only help establish a nominal delay across the microskew delay stages, but may also help maintain the microskew delay constant over temperature variation.

In reference to FIGS. 1 and 2, general calibration and testing are described in accordance with one or more embodiments, including microskew calibration and testing. During normal operation, the operating frequency of PLL 102 (e.g., PLL's current controlled oscillator (ICO) is frequency locked to a reference clock signal (e.g., Ref_Clk_A or Ref_Clk_B, which may be provided externally for example to circuit 100 during normal PLL operation). After frequency lock condition is achieved, the operating frequency of PLL 102 may be controlled by two current components. One of the current components is provided by DAC 104 (vco_calidac), which provides coarse frequency tuning, and the other current component is provided by the V2I circuit of PLL 102, which provides fine frequency tuning and compensates for temperature changes.

During manufacturer testing for example, PLL 102 may be set to a test mode such that the operating frequency of PLL 102 is not controlled by clock and feedback signals (e.g., CLK-REF_A, CLK_REF_B, Ref_Clk_A, Ref_Clk_B) or by the V2I circuit of PLL 102, but rather is controlled by DAC 104. Additionally for example, DAC 104 may be controlled by test equipment (e.g., control DAC 104 and thus PLL 102 by providing a test signal (e.g., a six bit code signal) to DAC 104), as would be understood by one skilled in the art. Therefore, the operating frequency of PLL 102 may be stepped up as a control signal to DAC 104 (e.g., a six bit binary code signal value) is stepped up, while monitoring the clock output operating frequency of PLL 102 and/or delay circuitry 120.

To calibrate the microskew skew delay range and skew steps of delay circuitry 120, DAC 104 may be adjusted (e.g., via the six bit binary code signal value) so that PLL 102 may operate as close as possible to a desired frequency (e.g., 600 MHz). DAC 104 may also have a dedicated volatile shadow register (e.g., within associated circuitry 108) accessible by the test equipment for this purpose. Thus for this example, the same six bit binary code signal value determined may also be programmed into the microskew memory location (e.g., EEPROM location within associated circuitry 108). Consequently, if the size, parasitic, and component loading of the microskew delay stages (e.g., within microskew delay circuit 216) are appropriately sized replicas (e.g., one-fourth) of the delay stages of PLL 102 and DAC 202 is also an appropriately sized replica (e.g., one-fourth) of DAC 104, then the same six bit binary code signal value controlling DAC 104 and DAC 202 may provide approximately the same delay across the delay stages of PLL 102 and microskew delay circuit 216.

As an example, the nominal delay through all four microskew delay stages of microskew delay circuit 216 may be approximately 0.5/F600, where F600 is a measured frequency around the 600 MHz target value. Thus, by comparing the actual operating frequency of PLL 102 to the target value (e.g., F600 of 600 MHz), an estimate may be determined of the actual microskew delay range and microskew step delay value achieved (e.g., based on the relationship between delay and frequency for PLL 102).

An alternative way, for example, to calibrate the microskew circuitry described herein may provide a faster test process than the prior example, but the nominal delay value through the microskew delay stages (e.g., within microskew delay circuit 216) may be less deterministic. As a specific example, during manufacturer testing, the clock, feedback signals (e.g., CLK-REF_A, CLK_REF_B, Ref_Clk_A, Ref_Clk_B), and/or dividers of PLL 102 are set such that the operating frequency of PLL 102 is set to a desired frequency (e.g., approximately 600 MHz). After PLL lock, the value of the six bit binary code signal that controls DAC 104 is read out to the test equipment, which then provides this same six bit binary code signal value to DAC 202 (e.g., DAC 114) via the control signal (uskew_idac), such as for example through microskew pins (<5:0> driven by EEPROM shadow registers) as shown in circuits 100 and 200. These calibration and test techniques may be performed by test circuit 110, for example, along with the manufacturer's test equipment.

The output current of DAC 104 may also be tested. For example, during manufacturer testing, a copy of the DAC 104 (PLL vco_calidac current, which biases the PLL ICO delay stages) may be sent out a test pin of circuit 100 (e.g., via test circuit 110). Also at approximately the same time, the equivalent current from DAC 114 (uskew_calidac) may also be sent out a test pin of circuit 100 (e.g., via test circuit 110). As DAC 114 (uskew_calidac) may be an appropriately sized replica (e.g., one quarter) of DAC 104 (PLL vco_calidac), the test current from DAC 114 (uskew_calidac) may be scaled up appropriately (e.g., by a factor of four). These 2 currents may be compared and, for example, if the same six bit value is driving DAC 104 and DAC 114, the currents should be approximately the same (e.g., except for various losses, such as device and DAC design mismatches and current mirroring losses). This process may also be used to fine tune the digital control value setting, such as by performing coarse tuning calibration and then comparing the currents from DAC 104 and DAC 114 to further calibrate out error sources (e.g., current mirroring mismatches).

As an example, during microskew calibration of delay circuitry 120 (calibrating the microskew (uskew)), the output test current of DAC 104 (PLL vco_calidac) corresponding to the six bit code value required to cause PLL 102 to operate at a desired frequency (F600, e.g., 600 MHz) may be recorded and compared to DAC 114 (uskew_calidac) output test current for the same six bit code value. If the two test currents are not equal, then the 6 bit code for DAC 114 (uskew_calidac) may be adjusted to cause its corresponding test current to approximately equal the value of current previously recorded for DAC 104 (PLL vco_calidac). This process may help compensate for mismatches between DAC 104 and DAC 114 and the two reference currents used by DAC 104 and DAC 114. Consequently, the microskew skew step value and total skew range may be set approximately to the desired value.

The current of DAC 208 (uskew_idac) may also be tested. As an example, during manufacturing testing, a scaled copy of the operating current used by the last four microskew delay stages of microskew delay circuit 216 may be sent out through a test pin (e.g., via test circuits 210 and 212). The delay select signal (dly_sel, e.g., uskew dly_sel<3:0>) may be controlled by the tester (e.g., manufacturer test equipment and/or test circuit 110) via the integrated circuit's volatile shadow registers (e.g., within associated circuitry 108). For example, as the binary value of the delay select signal (dly_sel) to skew selection decoder 206 is incremented from zero to fifteen, the output current of DAC 208 will monotonically decrease. This corresponds to a linear increase in delay across the four microskew delay stages from an initial nominal delay value and corresponds to incremental microskew clock skew steps. Thus, by examining the decrease in current with each increase of the delay select signal (dly_sel, e.g., uskew dly_sel<3:0>), it can be determined if the microskew clock skew steps are functional and constant and at approximately the desired values. For example, this determination may be based on prior characterization and simulation correlating the output current of DAC 208 (microskew uskew_i-dac) to the microskew clock skew steps.

As a specific example, adjustments to the exact microskew clock skew step value and skew delay range afforded by all fifteen microskew step settings via bits dlysel<3:0> of the delay select signal (dly_sel) may be performed. For example, a calibration frequency other than F600 during calibration may be used, which may be necessary to fine tune the microskew skew step and range to the exact value desired. However, the calibration frequency will be range limited to some extent, depending upon the specific implementation (e.g., 482 MHz to 1 GHz range). For this specific example implementation, calibration frequencies above 1 GHz may exceed the frequency response of the microskew delay stages for the lowest value of the delay select signal e.g., dly_sel<3:0>), while calibration frequencies below 482 MHz may result in the microskew delay stages to be non-functional due to severe current starvation for the highest value of the delay select signal (e.g., dly_sel<3:0> setting). Further to this example, at a calibration frequency of 482 MHz, the microskew delay stages may be operating at less than 350 Mhz at the maximum setting of the delay select signal (dly_sel e.g., dly_sel<3:0>, where for example 0.5/350 MHz equals 315/833×0.5/482 MHz).

For the above example, calibrating the microskew circuitry over a range of 482 MHz to 1 GHz may potentially allow for a microskew step selection of from 13 picoseconds to 69 picoseconds, which may provide a microskew delay range from approximately 200 to 1,000 picoseconds. However, as would be understood by one skilled in the art, simulations may be performed to determine and implement the desired and expected range of microskew delay step and delay range over which the microskew circuit may be calibrated for a desired application and specific implementation.

If F600 corresponds to a frequency of 600 MHz as in the above example, then for this implementation and settings example, the nominal delay through all four microskew delay stages may be approximately 833 picoseconds (e.g., for typical process conditions at 27° C.), with a skew step value of approximately 20 picoseconds yielding a skew delay range of 300 picoseconds. As an example, this value may be chosen to provide a span of one fine skew step at 400 MHz operation (i.e., 312.5 picoseconds), with calibration at 600 MHz so as to be well within the maximum and minimum frequencies allowed by circuits 100 and 200 for this example, while still providing for some calibration range adjustment.

Insertion delay of the microskew circuit, due to the delay through the five microskew delay stages (uskew_delay) of microskew delay circuit 216, occurs if a microskew enable signal (uskew_en) provides a logical high signal value to multiplexer 124 (FIG. 1, multiplexer 222 of FIG. 2) for a given bank channel (i.e., microskew delay circuit 216 is not bypassed). The insertion delay may be calculated based on equation (1), with dly_sel<3:0> being a binary value.

$$T\_insertion = T\_sig\_cond\_delay\_stage + T\_nom\_4\_delay\_stage + T\_skew\_adj \quad (1)$$

$$= 0.5/F600 \times [1/4 + 1 + ((dly\_sel\langle 3:0\rangle/15) \times 300/833)] \text{ picoseconds}$$

$$= [0.625 + (0.012 \times dly\_sel\langle 3:0\rangle)]/F600 \text{ picoseconds}$$

For example, if F600 equals 600 MHz and dly_sel<3:0> equals fifteen, then T_insertion equals approximately 1,341.7 picoseconds.

As an example, Table 1 illustrates pre-layout Spice simulation results for a microskew circuit implemented using one or more techniques disclosed herein in accordance with one or more embodiments.

TABLE 1

| Process | Vdd (Vdc) | Temp (° C.) | T delay Max-Min (PicoSec) | T step Average (PicoSec) | Process Variation (% Error) | Temp Variation (% Error) | I test nominal (uA) | Max/Min I test Ratio |
|---|---|---|---|---|---|---|---|---|
| nominal | 2.5 | 25 | 299.80 | 19.99 | NA | NA | 275.9 | 2.16 |
|  |  | −40 | 280.83 | 18.72 | NA | −6.3 | 247.1 | 2.15 |
|  |  | 135 | 318.06 | 21.20 | NA | +6.1 | 349.3 | 2.19 |
| slow | 2.5 | 25 | 341.10 | 22.74 | +13.8 | NA | 305.5 | 2.16 |
|  |  | −40 | 302.09 | 20.14 | +7.6 | −11.4 | 272.3 | 2.14 |
|  |  | 135 | 365.42 | 24.36 | +14.9 | +7.1 | 385.7 | 2.20 |
| fast | 2.5 | 25 | 291.83 | 19.46 | −2.7 | NA | 235.6 | 2.17 |
|  |  | −40 | 273.83 | 18.25 | −2.5 | −6.2 | 209.3 | 2.16 |
|  |  | 135 | 300.90 | 20.06 | −5.4 | +3.1 | 303.6 | 2.19 |

T delay max is a maximum selected microskew delay, T delay min is a minimum selected microskew delay, and T step average is calculated as (t delay max−t delay min)/15 for this example. T delay mid is a targeted theoretical middle selected microskew delay, which may be determined by selecting a code setting for DAC 202 (uskew_calidac, or DAC 114) equal to a value recorded for DAC 104 (PLL vco_calidac) for a specific reference frequency input to PLL 102. This code setting value may provide a T delay mid of approximately 0.5/Freq_pll_ref_input (e.g., approximately 14 MHz below 600 MHz at nominal/2.5v/25° C.) for this example The Spice simulation conditions for the above example include no process compensation other than code adjustments to DAC 104 (PLL vco_calidac code adjustment), the code setting for DAC 114 (uskew_calidac code value) is selected for the closest operation to and just above T delay mid operation (e.g., T delay mid equals approximately 0.5/600 MHz), and the code setting (e.g., IDAC code for DACs 104, 114, and 208) is a function of process skew. It should be noted, in reference to Table 1 for the above example, that process variation (% error) may occur even with calibration near 600 MHz. The current or voltage gain (e.g., for DACs 104, 114, and 208) and the microskew delay stage's delay/bias gain may be process and temperature dependent and excessive separation between skewed clocks should be avoided to prevent setup/hold violations between communicating integrated circuits.

As discussed herein, incrementing the value of the delay select signal (dly_sel, e.g., dly_sel<3:0>) may incrementally increase the delay value by a constant amount. The corresponding decrease in test output current, with each incremental increase in the delay select signal (dly_sel), may not be constant. For example, the delta decrease in current going from zero to one divided by the delta decrease in current going from fourteen to fifteen, may be a ratio approximately equal to Max/Min I_test as shown in Table 1 above. Thus, using the information disclosed herein, manufacturing test procedures may be performed as disclosed herein for microskew circuits implemented in accordance with one or more embodiments.

In general for example, clock generation and skew control techniques are provided herein to provide clock signals with appropriate clock delay, reduced channel-to-channel skew, and reduced system delay variations relative to some conventional approaches. For example, techniques disclosed herein for one or more embodiments may provide for the selecting of precise delay or skew shifts for controlling digital DLL, PLL, and FLL-based clock generators, synthesizers, or buffers. The techniques disclosed herein may also provide, for one or more embodiments, a method of selecting precise clock skew and de-skewing of clock channels and/or a method of providing vernier clock delay.

As an example, conventional techniques may allow unacceptable levels of delay variation with respect to a reference clock, a feedback clock, and/or PLL (or DLL or FLL) jitter. The delay variation may include reference clock delay variation, such as during startup lock acquisition and spread spectrum frequency modulation, or delay variation with the PLL, DLL, or FLL-stabilized operating frequency.

Typically a delay circuit (e.g., associated with the PLL) may be required to effectively operate over a range of frequencies that exceed those required of the PLL, DLL, or FLL. Thus, the delay circuit may be required to operate at frequencies below and above which the PLL (or DLL or FLL) is guaranteed to operate (e.g., having even greater performance capability), which requires more stringent design requirements and added cost and complexity. Furthermore, mismatches in the PLL or FLL delay stages and the delay stages may need to be compensated (e.g., dialed or tweaked) out, if possible, during manufacturing.

In other conventional approaches, the closed-loop frequency-control system is continuously linked (i.e., continuously controls) the delay stages. Consequently, variations in the operating frequency of the closed-loop frequency-control system will continuously vary the delay through the delay stages and require that the delay stage operate over the full range of operating frequencies of the closed-loop frequency-control system (e.g., from zero to just above the PLL lock frequency). Furthermore as a consequence, the delay through the delay stages may be subject to variations in the PLL's reference and feedback clocks (e.g., due to parasitic and/or spread spectrum modulation) and may also be subject to PLL systematic and parasitic clock jitter.

In contrast in accordance with one or more embodiments of the present invention, techniques are disclosed for providing clock signals, such as for multiple clock channels. As an example, delay may be based on the closed-loop frequency-control system (e.g., PLL, DLL, or FLL) frequency information rather than on phase and frequency. For example, delay may be based on the PLL, DLL, or FLL digital control word (i.e., not a continuous analog bias). Consequently, the digital control value (e.g., digital control word) may be captured and stored and thus, the delay will not be subject to the normal clock jitter (e.g., due to the input reference clock and/or PLL operational lock maintenance).

Furthermore for example, delay may be based on the closed-loop frequency-control system operating frequency only during calibration and the normal operation of the operating frequency will not affect the delay. In other words, the delay will not track the operating frequency, phase shift, and clock jitter of the closed-loop frequency-control system, including the reference clock or feedback clock.

The digital control word value programmed may be one of several recorded during calibration and published, so that the delay range and the delay step may be precisely that required by the end user of the integrated circuit (e.g., the chip which includes circuit 100). Additionally, fine tuning during manufacture or after may also be performed, as required, as would be understood by one skilled in the art. The delay also may be calibrated over a smaller frequency range within the closed-loop frequency-control system operating range so that the delay circuit performance is not required to match or exceed that of the PLL or FLL circuit.

The time delay or skew increase may be linear with respect to the digital control word (e.g., binary control word) and thus, the delay steps may be constant. For example, the thermometer decoding of the binary control word may provide this functionality along with the use of incrementally sized devices within circuits 100 and/or 200 (e.g., within the uskew IDAC circuitry (e.g., DAC 114)). In contrast, conventional approaches may exhibit a nonlinear relationship relative to a control signal and the time delay (e.g. a bowing affect) and delay steps may not be constant, but rather vary by a 2-to-1 ratio over a full delay adjustment range.

As further examples for embodiments, the clock input to the delay stage may be derived from the closed-loop frequency-control system (e.g., PLL, DLL, or FLL directly). Thus for example, the clock input to the delay may have rise and fall times more closely matched to PLL or FLL clock signals, which renders the time delay with more precise delay adjustments. Furthermore for an embodiment, a replica copy of at least a portion of the closed-loop frequency-control system (e.g., PLL or FLL IDAC circuit) may be used to establish frequency lock.

Additionally as an example, a copy of the digital control word may be used to establish the closed-loop frequency-control system operating frequency only during calibration of the delay. Also techniques disclosed herein for one or more embodiments do not require the use of current starved delay stages inside the closed-loop frequency-control system or in the delay circuits. As a further example, latching-type delay stages may be implemented, because they are less subject to jitter induced by supply noise. Accordingly for one or more embodiments, certain advantage may be achieved as noted herein relative to conventional approaches.

Figure 3:
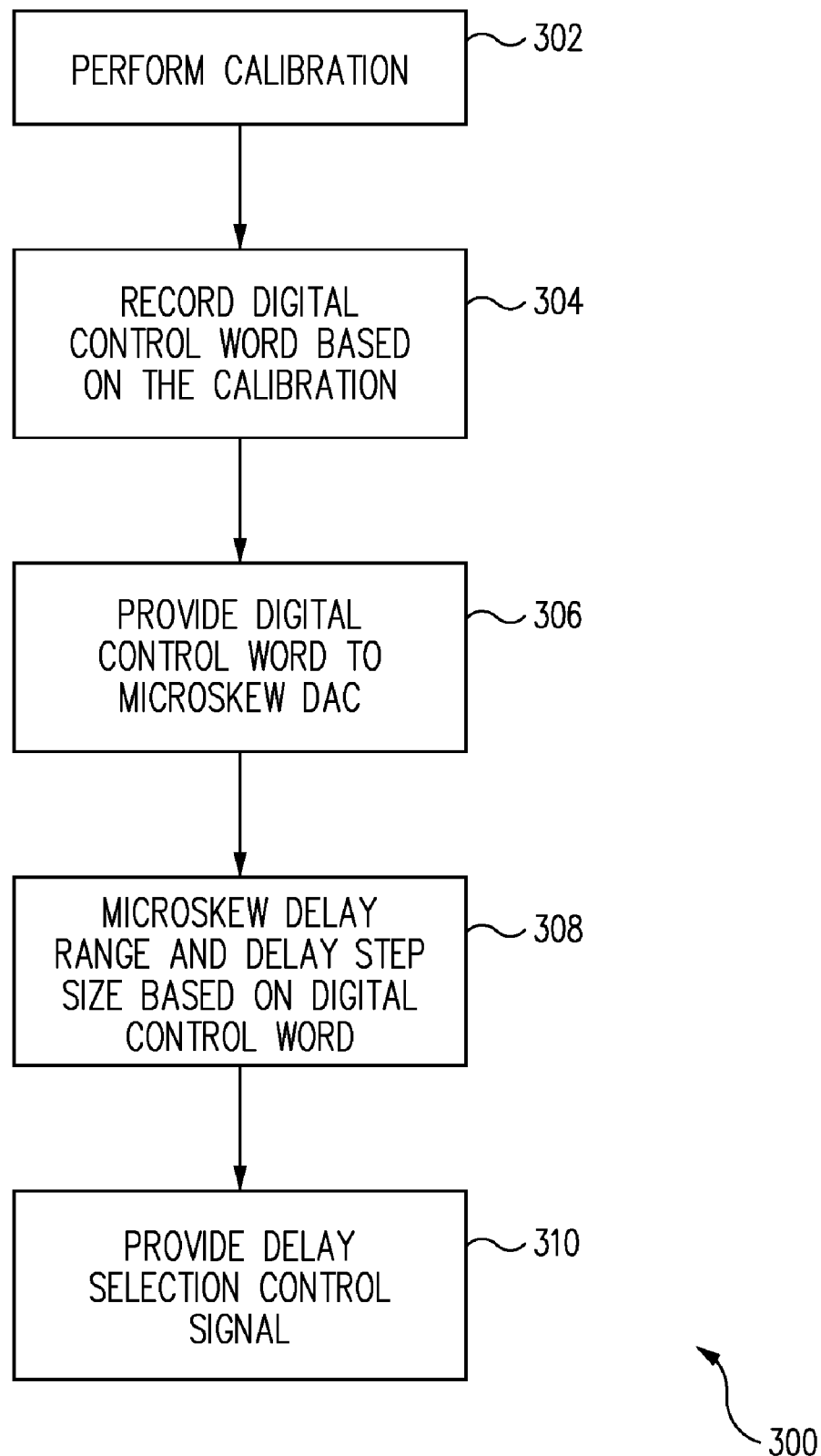
FIG. 3 shows a flowchart illustrating clock calibration and generation in accordance with an embodiment of the present invention.

As an example, FIG. 3 shows a flowchart 300 illustrating clock calibration and generation in accordance with an embodiment of the present invention. In general, flowchart 300 sets forth general operations that may be applied, such as for circuit 100 and/or circuit 200 as discussed herein (in reference to FIGS. 1 and 2).

Specifically, as discussed in reference to FIGS. 1 and 2, a digital control word is used to control generally an operating frequency of the closed-loop frequency-control system (e.g., PLL, FLL, or DLL (i.e., delay of the DLL)). For example, one or more digital control words (values) may be recorded during calibration (blocks 302 and 304). During calibration (block 302), the closed-loop frequency-control system may be operated at a frequency(s) corresponding most closely to a desire delay range and delay steps required by a user of the integrated circuit.

The digital control word (e.g., one or more values) are recorded in memory (e.g., programmed into EEPROM), such as for example a memory location reserved specifically for use by the microskew delay circuitry. Thereafter, the tuning or other operations of the closed-loop frequency-control system or changes to its digital control word, including any bias from or adjustments, will not affect the microskew delay circuitry as it is based on the stored digital control word.

The stored digital control word is provided to the microskew DAC (block 306, e.g., the memory drives DAC 114 of FIG. 1), which may be an appropriately sized replica of the DAC associated with the closed-loop frequency-control system. The microskew DAC (e.g., IDAC) biases the microskew delay step DAC (e.g., IDAC, such as DAC 208), which sets the delay range and delay step size (block 308).

A control word (e.g., a binary control word) may be provided to select a specific delay and delay step (block 310). For example, the control word may be used to drive a decoder (e.g., skew selection decoder 206, which may be implemented as a thermometer decoder) utilized by the microskew circuit. The output from the decoder drives the microskew delay step IDAC (e.g., DAC 208) to select a specific delay and delay step for the microskew circuit.

As an example, the devices within the microskew delay step IDAC (e.g., DAC 208) may have incrementally increasing sizes so that the delay and delay step value may be approximately linear with respect to the control word provided to the decoder, as would be understood by one skilled in the art. Furthermore, for example, the delay stage topology may be a latched design, rather than a current starved type of design, so that supply induced phase jitter may be minimized.

In general in accordance with one or more embodiments, microskew (U-skew) systems and methods are disclosed herein. The microskew circuitry, for example, may be provided for multiple output banks or channels, with a programmable power down per bank (for an unused bank) and a programmable enable per bank (else bypass). The microskew circuitry may be used in a fan-out buffer mode (e.g., the associated PLL does not need to be operating) and may provide programmable microskew steps, with skew step size and number of steps arbitrary and may be tailored and determined for a desired application and requirements. As a specific example, the microskew circuitry may provide sixteen available skews, which span a range of 300 picoseconds in fifteen 20 picosecond steps (e.g., calibrated at 600 MHz).

The microskew circuitry may provide all bank and internal feedback channels with identical circuitry to aid in channel matching and minimize unique circuitry for a given channel or unique to the generation of any skew(s) (i.e., generate all skews in a consistent manner with identical circuitry across banks). For example, common, identical circuitry may reduce any undesired mismatch between the various skews.

Furthermore, the techniques disclosed herein may minimize critical half cycle delay paths, which limit maximum frequency operation and cause skew timing edge inaccuracies (e.g., with respect to any critical, weak link, nodes within a specific design application). Circuits within a given design that are a part of a frequency or a clock path may also be implemented, for example, using differential logic, which may help maintain a fifty percent duty cycle from the PLL inputs to all clock outputs.

Systems and methods are disclosed herein to provide improved clock, delay, and skew techniques. For example, in accordance with an embodiment of the present invention, a method is disclosed for providing clock, delay, and skew techniques for clock signals for multiple channels. Embodiments described above illustrate but do not limit the invention. It should also be understood that numerous modifications and variations are possible in accordance with the principles of the present invention. Accordingly, the scope of the invention is defined only by the following claims.

What is claimed is:

1. An integrated circuit comprising:
   a closed loop control system adapted to provide a clock signal;
   a first digital-to-analog converter (DAC) adapted to provide a control signal to the closed loop control system to provide coarse tuning of the closed loop control system;
   a memory adapted to store a control signal value based on the coarse tuning of the closed loop control system;
   a second DAC adapted to receive the control signal value stored in the memory and provide a reference signal based on the control signal value; and
   a plurality of delay circuits, wherein each of the delay circuits comprises:
   a plurality of delay stages configured in a series and adapted to receive the clock signal and provide a delayed clock signal;
   a third DAC adapted to provide a control signal to the plurality of delay stages to control the delay applied by the plurality of delay stages to the clock signal, wherein the third DAC receives the reference signal from the second DAC to control the delay range and the delay step size; and
   a decoder adapted to receive a delay select control signal and provide a select control signal to the third DAC to select the delay that the third DAC sets for the plurality of delay stages.

2. The integrated circuit of claim 1, wherein the closed loop control system is adapted to achieve lock based on its fine tuning subsequent to the coarse tuning, and wherein subsequent tuning of the closed loop control system after storing the control signal value does not change the delay range and the delay step size of the delay circuit.

3. The integrated circuit of claim 1, further comprising:
   a reference circuit adapted to bias the first DAC, wherein the reference circuit is further adapted to bias the second DAC with an appropriately sized replica of the bias provided to the first DAC; and
   wherein the second DAC is an appropriately sized replica of the first DAC.

4. The integrated circuit of claim 3, wherein the delay range and the delay step size is further based on the bias provided to the second DAC from the reference circuit.

5. The integrated circuit of claim 3, wherein delay stages within the delay circuit are appropriately sized replicas of delay stages within the closed loop control system.

6. The integrated circuit of claim 1, wherein the closed loop control system comprises a phase-locked loop, a delay-locked loop, or a frequency-locked loop.

7. The integrated circuit of claim 1, wherein the delay circuit provides a plurality of the delayed clock signals, with each delayed clock signal having its corresponding specific delay based on its corresponding delay select control signal.

8. The integrated circuit of claim 1, further comprising:
a first multiplexer adapted to receive the clock signal and a clock reference signal and provide the clock signal or the clock reference signal to the delay circuit;
a second multiplexer adapted to receive the clock signal or the delayed clock signal to provide as a final clock output signal; and
a fan-out buffer adapted to provide the clock reference signal to the delay circuit, wherein the delay circuit provides the specific delay to the clock reference signal regardless of whether the closed loop control system is operating subsequent to the control signal value being stored.

9. The integrated circuit of claim 1, further comprising a test circuit adapted to receive signal values from the closed loop control system to compare to a first set of signal values from the delay circuit, wherein the test circuit is further adapted to receive a second set of signal values from the delay circuit to test against values provided by the delay select control signal.

10. An integrated circuit comprising:
a closed loop control system adapted to provide a clock signal;
a first digital-to-analog converter (DAC) adapted to provide a control signal to the closed loop control system to provide coarse tuning of the closed loop control system;
a memory adapted to store a control signal value based on the coarse tuning of the closed loop control system;
a second DAC adapted to receive the control signal value stored in the memory and provide a reference signal based on the control signal value; and
a delay circuit adapted to receive the clock signal, the reference signal, and a plurality of delay select control signals and provide a plurality of delayed clock signals, wherein a delay range and a delay step size of the delay circuit is based on the reference signal, and wherein a specific delay within the delay range applied to the clock signal to provide the plurality of delayed clock signals is based on the corresponding delay select control signals, wherein the delay circuit comprises for each of the delayed clock signals:
a plurality of delay stages configured in a series and adapted to receive the clock signal and provide the corresponding delayed clock signal;
a third DAC adapted to provide a control signal to the plurality of delay stages to control the specific delay applied by the plurality of delay stages to the clock signal, wherein the third DAC receives the reference signal from the second DAC to control the delay range and the delay step size; and
a decoder adapted to receive the corresponding delay select control signal and provide a select control signal to the third DAC to select the specific delay that the third DAC sets for the plurality of delay stages.

11. An integrated circuit comprising:
a closed loop control system adapted to provide a clock signal;
a first circuit adapted to provide a control signal to the closed loop control system for tuning the closed loop control system;
a memory adapted to store a control signal value based on the tuning of the closed loop control system;
a second circuit adapted to receive the control signal value stored in the memory and provide a reference signal based on the control signal value; and
a plurality of the delay circuits, wherein each of the delay circuits includes:
a plurality of delay stages adapted to receive the clock signal and provide a delayed clock signal;
a third circuit adapted to control the delay applied by the plurality of delay stages to the clock signal, wherein the third circuit receives the reference signal from the second circuit to control the delay range and the delay step size; and
a decoder adapted to control the third circuit to select a delay for the plurality of delay stages.

12. The integrated circuit of claim 11, wherein the third circuit is responsive to a delay select control signal in controlling the delay applied by the plurality of delay stages.

13. The integrated circuit of claim 11, wherein each of the first, second, and third circuits is a digital-to-analog converter (DAC).

14. The integrated circuit of claim 11, wherein the closed loop control system comprises a phase-locked loop, a delay-locked loop, or a frequency-locked loop.

* * * * *